(12) United States Patent
Fischer (10) Patent No.: US 9,619,448 B2
(45) Date of Patent: *Apr. 11, 2017

(54) AUTOMATED DOCUMENT REVISION MARKUP AND CHANGE CONTROL

(71) Applicant: International Business Machines Corporation, Armonk, NY (US)

(72) Inventor: Stephen E. Fischer, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/844,108

(22) Filed: Sep. 3, 2015

(65) Prior Publication Data
US 2015/0378971 A1  Dec. 31, 2015

Related U.S. Application Data

(63) Continuation of application No. 13/736,137, filed on Jan. 8, 2013, now Pat. No. 9,208,136, which is a
(Continued)

(51) Int. Cl.
*G06F 17/22* (2006.01)
*G06F 17/21* (2006.01)
(Continued)

(52) U.S. Cl.
CPC ........ *G06F 17/2247* (2013.01); *G06F 17/218* (2013.01); *G06F 17/2288* (2013.01); *G06F 17/245* (2013.01); *G06F 17/30011* (2013.01)

(58) Field of Classification Search
CPC .................................................... G06F 17/245
See application file for complete search history.

(56) References Cited

U.S. PATENT DOCUMENTS 5,606,669 A * 2/1997 Bertin ..................... H04L 45/00
370/256
6,735,605 B2 * 5/2004 Bird .................. G06F 17/30371
(Continued)

OTHER PUBLICATIONS

D. Edgell, A DITA Case Study: Service Learning, Software Documentation, and Redesign, IEEE, 2008.*
(Continued)

*Primary Examiner* — Maikhanh Nguyen
(74) *Attorney, Agent, or Firm* — Patrick J. Daugherty; Driggs, Hogg, Daugherty & Del Zoppo Co., LPA (57) ABSTRACT

Automated comparison of Darwin Information Typing Architecture (DITA) documents for revision mark-up includes reading document data from first and second DITA documents into respective document object model trees of nodes, and identifying and collapsing emphasis subtree nodes in the trees into their parent nodes, the collapsing caching emphasis data from the identified subtree nodes. A traversal transforms the model trees into respective node lists and captures adjacent sibling emphasis subtree nodes as single text nodes. The node lists are merged into a merged node list that recognizes matches node pairs having primary sort key information and document structure metadata meeting a match threshold, with differences between matching tokens of the node pairs saved. A merged document object model built from the refined merged node list is transformed into a hypertext mark-up language document.

20 Claims, 5 Drawing Sheets

Related U.S. Application Data continuation of application No. 13/290,492, filed on Nov. 7, 2011, now Pat. No. 8,381,095.

(51) Int. Cl.
*G06F 17/24* (2006.01)
*G06F 17/30* (2006.01)

(56) References Cited

U.S. PATENT DOCUMENTS

| | | | | |
|---|---|---|---|---|
| 7,203,624 | B2* | 4/2007 | Warshawsky | G06F 11/3452 702/186 |
| 7,689,910 | B2 | 3/2010 | Hennum et al. | |
| 7,844,632 | B2* | 11/2010 | Zhou | G06F 17/2205 707/796 |
| 7,856,575 | B2* | 12/2010 | Bock | G06F 11/079 714/26 |
| 8,127,225 | B2* | 2/2012 | Petri | G06F 17/30011 707/609 |
| 2002/0188613 | A1* | 12/2002 | Chakraborty | G06F 7/32 |
| 2004/0221228 | A1* | 11/2004 | Day | G06F 17/2247 715/234 |
| 2005/0278273 | A1* | 12/2005 | Uthe | H04L 41/0631 |
| 2006/0173821 | A1 | 8/2006 | Hennum et al. | |
| 2007/0239749 | A1* | 10/2007 | Farahbod | G06F 17/2725 |
| 2007/0277101 | A1* | 11/2007 | Barber | G06F 3/0486 715/272 |
| 2008/0098412 | A1* | 4/2008 | Zhou | G06F 9/4428 719/328 |
| 2009/0106303 | A1 | 4/2009 | Petri | |
| 2009/0113248 | A1* | 4/2009 | Bock | G06F 11/0748 714/39 |
| 2009/0125804 | A1* | 5/2009 | Brown | G06F 17/227 715/239 |
| 2009/0193036 | A1* | 7/2009 | Petri | G06F 17/30011 |

OTHER PUBLICATIONS

D. Day, "An Introduction to Darwin Information Typing Architecture: DITA", IBM, Nov. 2004.*

N. Harrison, "The Darwin Information Typing Architecture (DITA): Applications for Globalization", IBM, IEEE, 2005, pp. 115-121.*

Edgell, DA.: "A DITA case study: service learning software documentation and redesign"; 2008 IEEE International Professional Communication Conference; 2008.

Harrison, N.; "The Darwin Information Typing Architecture (DITA): applications for globalization"; 2005 IEEE International Professional Communication Conference (IACC); 2005.

Day, D.; "An introduction to Darwin Information Typing Architecture: DITA"; IBM Corporation. www.xmlaustin.org/wk/251/4/donday-dita . . . ; Nov. 2004.

Rosenberg, J. et al.; "An Extensible Markup Language (XML) Document Format for Indicating a Change in XCAP Resources"; http://priorartdatabase.com/IPCOM000195872D; May 1, 2010.

"DITA Specialization", May 9, 2005,2 pages.

Day et al. "Introduction to the Darwin Information Typing Architecture", IBM Corporation, Updated Sep. 28, 2005, 13 pages.

Day et al. "An XML Architecture for Techinal Documentation: The Darwin Information Typing Architecture", STC's 50th Annual Conference Proceedings, 2003, pp. 248-254.

Leslie et al., "Transforming Documentation from the XML Doctypes Used for the Apache Website to DITA: a Case Study", ACM, Oct. 21-24, 2001, pp. 157-164.

T. Zschocke, "Subject Classification with DITA Markup for Agricultural Learning Resource: A Case Example in Agroforestry", MTSR 2011, 2001, pp. 500-513.

U.S. Appl. No. 13/736,137, filed Jan. 8, 2013.

Notice of Allowance (Mail Date Jul. 31, 2015) for U.S. Appl. No. 13/736,137, filed Jan. 8, 2013.

* cited by examiner

AUTOMATED DOCUMENT REVISION MARKUP AND CHANGE CONTROL

BACKGROUND

Embodiments of the present invention relate to using automated processes to determine changes between different versions of document files comprising text information, and to indicate the determined changes to a user in a useful manner.

It is known to use programmable device applications to compare different versions of document files to determine changes in document content. Often the determined changes are indicated to user through inserting mark-ups directly in a merged version combining two different document versions, the mark-ups in a format indicating the nature of the change, for example showing moved or deleted text items in a strikethrough font, and added or inserted items in an underlined font. Mark-ups are also often depicted in different color fonts, in order to more readily recognize them in a color contrast with the font of the unchanged document items.

While mark-up processes may be straightforward and efficient in noting relative changes in text content, documents comprising constituent components organized in a logical structural arrangement or schema present additional challenges in efficient document comparison. Document schema define methods for machine-to-machine communication of structured data, in one aspect enabling end user display means to display document content with specified emphasis (bold, italic font, etc.) or tables structures. Schema support interoperable interaction within a given network or service domain to enable consistent replication of a desired document display format across a variety of end user display applications and devices.

One commonly used schema is Darwin Information Typing Architecture (DITA), an Extensible Markup Language (XML) data model for design for capturing, authoring and publishing document content. DITA provides opportunities to link processes for authoring, producing and delivering information with underlying information technology infrastructures that support content-related activities. In contrast to book or chapter hierarchies, DITA document content is mapped through links to pluralities of small topic items which may be reused in other documents. DITA topics are organized in a sequence in which they are intended to appear in a finished document, wherein a DITA map defines a table of contents for deliverables. Relationship tables in DITA maps can also specify which topics link to each other.

Thus, DITA enables the reuse of modular topics in different deliverables over a large variety of content contexts. However, the topic-orientation of DITA documents renders effective automated document comparison based on text comparison problematic, for example often generating large pluralities of unimportant or even spurious mark-ups due to changes in document structure that may obfuscate document content changes actually of interest.

BRIEF SUMMARY

In one embodiment of the present invention, a method for automated comparison of Darwin Information Typing Architecture (DITA) documents for revision mark-up includes a processing unit reading document data from first and second DITA documents into respective document object model trees of nodes, and identifying and collapsing emphasis subtree nodes in the trees into their parent nodes, wherein the collapsing caches emphasis data from the identified subtree nodes. A traversal transforms the model trees into respective node lists, the listed nodes each having primary sort key information and document structure metadata. The node lists are merged into a merged node list that recognizes matches of node pairs from each list that have primary sort key information and document structure metadata meeting a match threshold, and that saves differences between matching tokens of the node pairs. A merged document object model built from the refined merged node list is transformed into a hypertext mark-up language document that displays the saved differences between the matching tokens as word-level highlighting mark-ups within the refined tables.

In another embodiment, a method for providing a service for automated comparison of Darwin Information Typing Architecture (DITA) documents for revision mark-up includes providing computer infrastructure that reads document data from first and second DITA documents into respective document object model trees of nodes, and identifies and collapses emphasis subtree nodes in the trees into their parent nodes, the collapsing caching emphasis data from the identified subtree nodes. A traversal transforms the model trees into respective node lists, the listed nodes each having primary sort key information and document structure metadata. The node lists are merged into a merged node list that recognizes matches of node pairs from each list that have primary sort key information and document structure metadata meeting a match threshold, and that saves differences between matching tokens of the node pairs. A merged document object model built from the refined merged node list is transformed into a hypertext mark-up language document that displays the saved differences between the matching tokens as word-level highlighting mark-ups within the refined tables.

In another embodiment, a system has a processing unit, computer readable memory and a computer readable storage medium device with program instructions, wherein the processing unit, when executing the stored program instructions reads document data from first and second DITA documents into respective document object model trees of nodes, and identifies and collapses emphasis subtree nodes in the trees into their parent nodes, the collapsing caching emphasis data from the identified subtree nodes. A traversal transforms the model trees into respective node lists, the listed nodes each having primary sort key information and document structure metadata. The node lists are merged into a merged node list that recognizes matches of node pairs from each list that have primary sort key information and document structure metadata meeting a match threshold, and that saves differences between matching tokens of the node pairs. A merged document object model built from the refined merged node list is transformed into a hypertext mark-up language document that displays the saved differences between the matching tokens as word-level highlighting mark-ups within the refined tables.

In another embodiment, an article of manufacture has a computer readable storage medium device with computer readable program code embodied therewith, the computer readable program code comprising instructions that, when executed by a computer processor, cause the computer processor to read document data from first and second DITA documents into respective document object model trees of nodes, and identify and collapse emphasis subtree nodes in the trees into their parent nodes, the collapsing caching emphasis data from the identified subtree nodes. A traversal transforms the model trees into respective node lists, the listed nodes each having primary sort key information and document structure metadata. The node lists are merged into a merged node list that recognizes matches of node pairs from each list that have primary sort key information and document structure metadata meeting a match threshold, and that saves differences between matching tokens of the node pairs. A merged document object model built from the refined merged node list is transformed into a hypertext mark-up language document that displays the saved differences between the matching tokens as word-level highlighting mark-ups within the refined tables.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk-80™, C++ or the like and conventional procedural programming languages, such as the "C" programming language or similar programming languages. C++ or the like and conventional procedural programming languages, such as the "C" programming language or similar programming languages. (JAVA and all Java-based trademarks and logos are trademarks or registered trademarks of Oracle and/or its affiliates; SMALLTALK-80 is a trademark of ParcPlace Systems and/or its affiliates in the United States or other countries.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Rapid and accurate visualization of proposed changes is desirable for evaluation of proposed changes to a DITA topic and also for comparing DITA topic versions. However, comparison of normalized DITA XML text lines is not generally intuitive but instead requires knowledge of the underlying DITA XML structure. Manual comparison of two documents in any format is error-prone and time consuming, so automation provides great benefit. And although the DITA can be converted into HyperText Mark-up Language (HTML) or Portable Document Format (PDF) and compared automatically using the prior art, the results are less than ideal, resulting in false deltas and poor handling of emphasis (bold/italic/etc.) and especially of tables. Similarly, the DITA itself can be automatically compared using prior art tools, but again the results are less than ideal and have similar issues. More particularly, recognizing insertion or deletion of blocks of text information is non-trivial in DITA comparison, and prior art automated solutions typically generate many spurious "false delta" mark-ups that note format changes not relevant to content semantics of interest. Thus, prior art process often insert unwanted or useless mark-ups noting different page splits or paragraph locations, the mark-ups causing visual clutter hindering effective document comparison.

Figure 1:
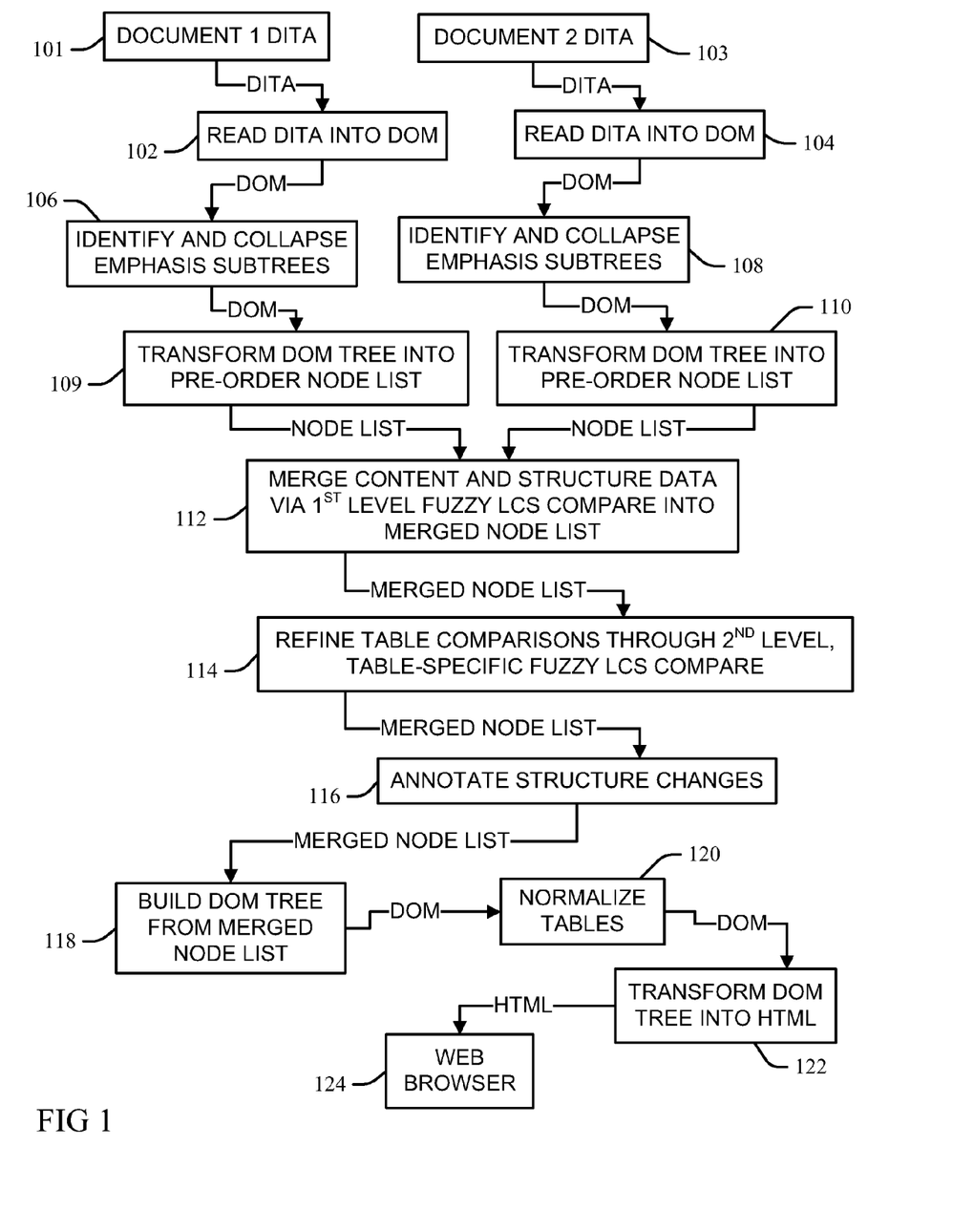
FIG. 1 is a block diagram illustration of a method or system according to the present invention for performing an automated comparison of DITA documents for revision mark-up.

FIG. 1 illustrates one embodiment of a method or process for automated comparison of DITA XML documents for revision mark-up according to the present invention. Document data from two respective DITA XML documents 101 and 103 is read into respective Document Object Model (DOM) trees at 102 and 104. More particularly, DITA XML text files comprise an inherent tree structure which encodes the relative hierarchies of each section or topic within the document, and this tree structure is read at 102/104.

Emphasis subtrees each are identified and collapsed at 106 and 108. More particularly, at 106 and 108 all of the XML DOM subtrees consisting entirely of text emphasis nodes (for example, bold, italic, underline, subscript, superscript, cross-reference, phrase, etc.) are found and saved as parent node attributes. This supports atomic, specialized handling of the emphasis subtrees, as the addition or removal of emphasis tags is not seen as a change in structure, and wherein the XML data is cached for each table for later use in special table reprocessing as described below.

At 109 and 110 a preorder traversal is performed that ravels or transforms the DOM trees of the respective documents 101 and 103 into respective pre-order lists of nodes each comprising primary sort key (comparison string) information and document structure metadata. For example, metadata may include "colname" column name data for all entry children within a column in the DITA document to help a later reconstruct process step keep them together. The pre-order traversal transformation captures the adjacent sibling emphasis subtrees saved as parent node attributes at 106/108 as a single text node, in one aspect so changes in emphasis don't look like changes in structure during document comparison.

At 112 a first-level fuzzy Longest Common Subsequence (LCS) process uses the pre-order node list primary sort key information and some of the metadata for equivalence comparison to merge the overall text content and structure of the two documents into a merged node list. Fuzzy matches of node pairs are recognized through use of a token-by-token LCS process, wherein if a number of tokens and a percentage of match meets respective thresholds of the LCS then compared nodes in the respective documents are determined to match in the merged node list. Differences between said matching tokens (token-by-token deltas) are remembered (saved) to supply word-level highlighting mark-ups to a merged document output as desired and optimized through further process described below.

At 114 a $2^{nd}$ level, table-specific fuzzy LCS process use the XML metadata cached at 106/108 to refine table comparisons in the merged node list. The $2^{nd}$ level process may comprise a plurality of phases, each running in a variety of comparison modes depending on where it is called with respect to metadata data attributes: for example, requiring a column name or a table header match. Though the embodiment may be structured to call out only text content changes, at 116 structure changes of interest may also be selected for annotation through mark-up. At 118 a document object model is built from the merged node list, and tables in the built DOM are normalized as a function of the table metadata to correct structural table issues at 120. At 122 the merged node list is then transformed into a HTML to display text content changes, and optionally some structure changes, through inserting mark-ups in a merged document represented in a web browser at 124.

By the use of multi-level LCS processes on pre-order, linearized DOM tree transforms of the DITA data, the embodiment of FIG. 1 merges structure and content data simultaneously while still enabling the process to distinguish between emphasis and other, structural markup tags. The preorder traversal process reveals text content first, and then the structural metadata as a function of the tree organization, and this order is exploited to differentiate the handling of the respective content and structure data. More particularly, leaves of the DOM structure trees of the DITA documents 101 and 103 without children comprise the data content, wherein the tree elements above these leaves show how the content is organized, the structure of each DITA document (emphasis, column and table locations, etc.).

Some prior art approaches sequence said leaves one after another and apply LCS or other comparison processes to said leaf content data in order to find content deltas. However, merely using the content deltas to reassemble merged data into a mark-up document presents problems when structural data is also changed between the compared documents, in one aspect as structure data differences between the compared documents will confuse reassembly processes. For example, if a paragraph gets moved from one area of a document to another, then overall document registration is disrupted as one progresses through the document for word-level or block level comparison: the same paragraph text blocks may now have different paragraph numbering, or appear on different pages. Further, because tables are stored row-by-row in DITA document structures, column changes are extremely difficult to visualize when reading line-by-line text comparison results from normalized DITA XML text. In contrast, the present embodiment uses additional, table-specific LCS processes to maintain registration of other document elements surrounding a changed block area, thereby not only merging the structure with the content to compute delta on content and structure simultaneously, but also handling table structure changes by merging the structures of the two tables to be compared. More particularly, embodiments of the present invention address the problem of automatically highlighting proposed changes or deltas between two DITA XML format document by generating strikethrough and addition markup highlighting in a merged/combined document, given as input an original and modified document (without any change markup) in the DITA XML format. The result of the compare is a valid DITA document that may be published (for example, to PDF, to the web, etc.) in the same way that the original documents may be published.

Figure 2:
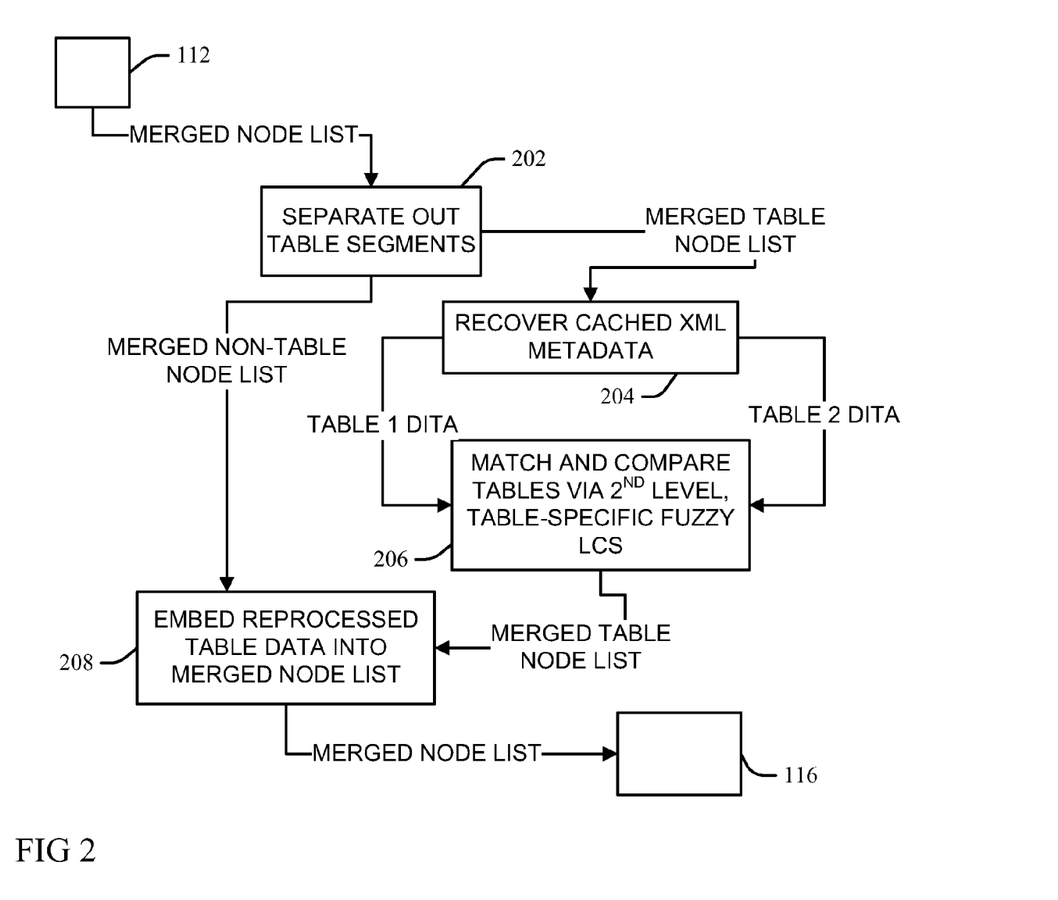
FIG. 2 is a block diagram illustration of an embodiment of the present invention method for performing an automated comparison of DITA documents for revision mark-up.

FIG. 2 illustrates one embodiment of the $2^{nd}$ level, table-specific fuzzy LCS processes of 114 of FIG. 1. At 202 table segments in a merged node list input provided from the $1^{st}$ level LCS at 112 are separated out, producing respective table and non-table node list outputs. At 204 the XML metadata cached at 106/108 is recovered for each of a Table 1 of the Document 1 DITA 101 and a Table 2 of the Document 2 DITA 103 in the table node list output, and a table-specific LCS process applied to the tables and their recovered metadata at 206 to match, compare and otherwise reprocess the document tables in the merged table node list. At 208 the reprocessed merged table node list is embedded into the merged node list in combination with the non-table node list to generate a refined merged node list output for use in the subsequent processes 116 et seq of FIG. 1.

Figure 3:
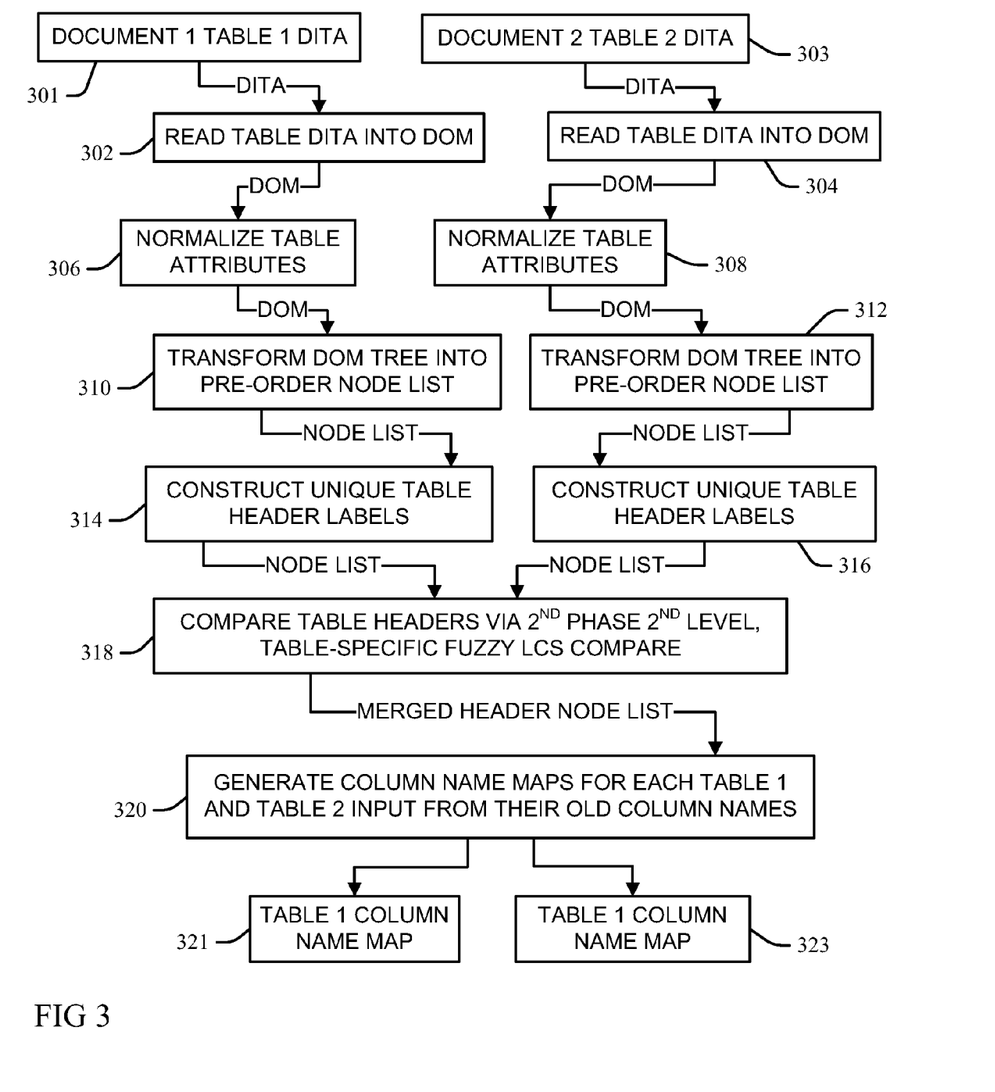
FIG. 3 is a block diagram illustration of an embodiment of the present invention method for performing an automated comparison of DITA documents for revision mark-up.
Figure 4:
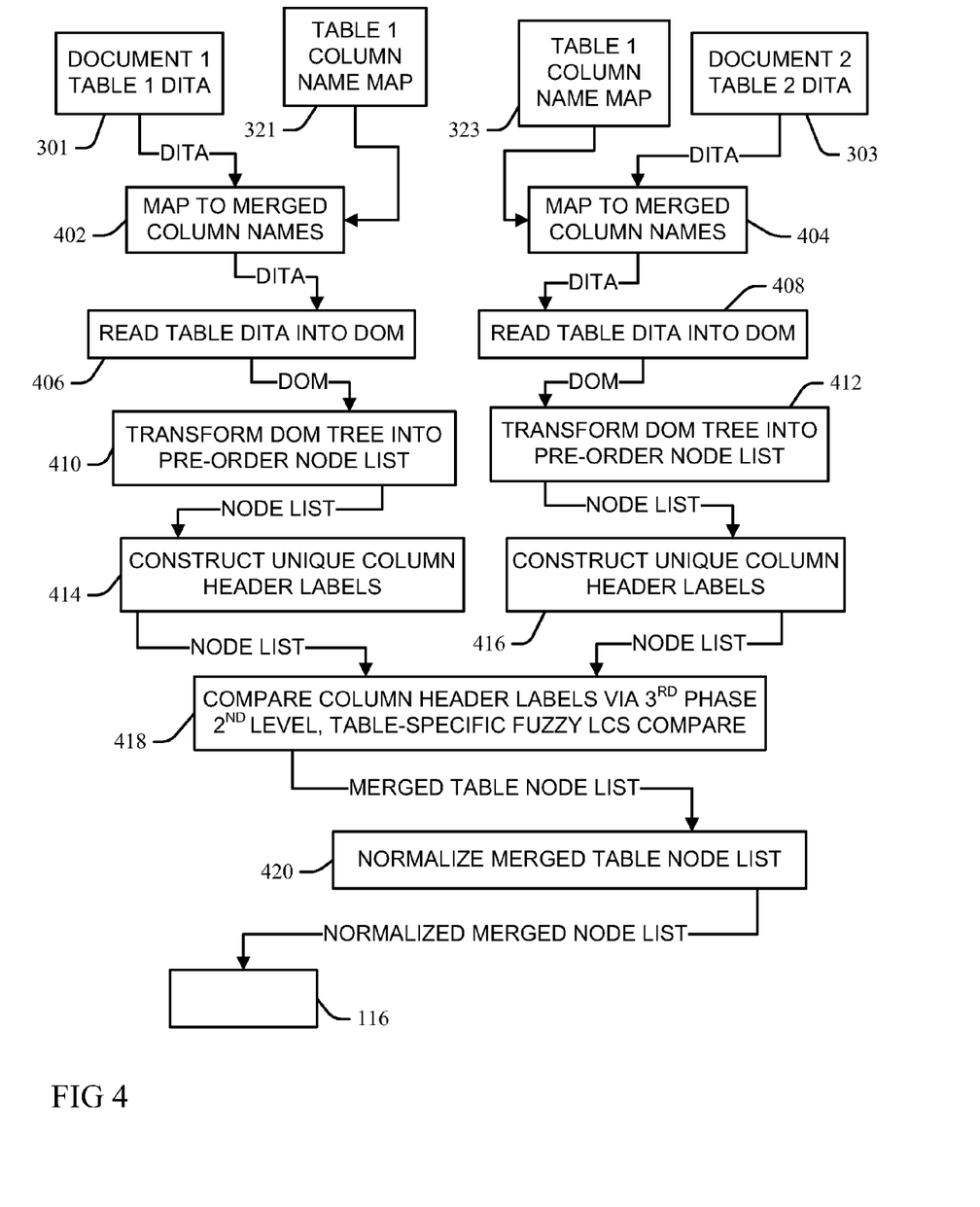
FIG. 4 is a block diagram illustration of an embodiment of the present invention method for performing an automated comparison of DITA documents for revision mark-up.

FIGS. 3 and 4 illustrate one embodiment of the present invention that generate a mark-up merged document by performing three phases of LCS compares: a first phase at the $1^{st}$ level (at 112, FIG. 1), and then two additional, different second and third phases at the $2^{nd}$, table-specific LCS level (at 206, FIG. 2). More particularly, referring now to FIG. 3 respective DITA document 1 table 1 metadata 301 and document 2 table 2 303 metadata is read into DOM trees at 302 and 304, and table attributes of each normalized at 306 and 308. Preorder traversals are performed at 310 and 312 to transform the respective DOM trees into pre-order node list outputs, and unique table header labels are constructed for the nodes in the respective tables at 314 and 316. At 318 a $2^{nd}$ phase $2^{nd}$ level, table-specific fuzzy LCS process compares the constructed header labels of the tables to generate a merged header node list. At 320 the column header text is analyzed to distinguish between new and modified columns, and column name maps 321 and 323 are generated from old column names for each input table to the merged table column names.

Referring now to FIG. 4, at 402 and 404 the DITA document 1 table 1 metadata 301 and document 2 table 2 303 metadata is mapped to the merged node list column names via the column name maps 321 and 323. The mapped data for each document is read into respective DOM trees data at 406 and 408, and preorder traversals at 410 and 412 transform the DOM trees into respective pre-order node list outputs. Unique column header labels are constructed for the respective tables at 414 and 416, and at 418 a $3^{rd}$ phase $2^{nd}$ level, table-specific fuzzy LCS process compares the constructed column header labels of the tables to generate a merged table node list, which is normalized as a function of the table metadata to correct structural table issues at 420, the output available for use in the subsequent processes 116 et seq of FIG. 1.

The embodiment of FIGS. 3 and 4 transforms structural metadata within the DITA documents into column and header text data that may be merged simultaneously and easily compared through second level, table-specific LCS processes to distinguish between new columns and modified columns. The first LCS phase merges the overall content and structure. The second LCS phase compares table headers so matching columns can be tagged and aligned. The third LCS phase re-merges tables with tagged columns, so the columns stay aligned. The LCS used also recognizes fuzzy matches; it considers phrases as matching if a sufficient number of the words match. When phrases fuzzy match, deltas may be indicated on the word level. In addition, the embodiment handles emphasis markup specially, so changes in emphasis do not unnecessarily confuse the change markup.

Text comparison results may thus be clearly rendered in mark-up generation by maintaining correct column alignment in merged tables through the column name mapping based on column header analysis described above. Using two levels of LCS, at each of respective text content and structural metadata levels, enables document comparison at both the node level and at the word level. As changes in table structures are determined at a different level, a user may choose to indicate such structure changes uniquely with respect to text content change mark-ups where appropriate (for example, with extra explanatory text/symbols, differently bracketed text, etc.), or the user may omit the noted structural change to display only text content changes. Embodiments of the present invention may be implemented in a variety of code applications. Examples include Visual Basic™ for Applications (VBA) and JAVA, and still others will be apparent to one skilled in the art. (VISUAL BASIC is a trademark of Microsoft Corporation in the United States, other countries, or both.)

Figure 5:
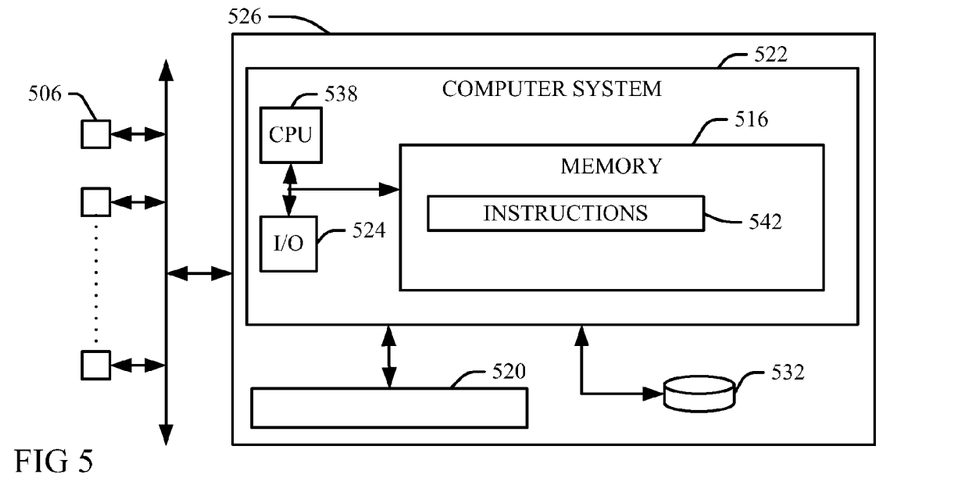
FIG. 5 is a block diagram illustration of a computerized implementation of an embodiment of the present invention.

Referring now to FIG. 5, an exemplary computerized implementation of an embodiment of the present invention includes a computer or other programmable device 522 in communication with one or more sources of DITA documents 506. Instructions 542 reside within computer readable code in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to perform an automated comparison of DITA documents from the sources 506 or other input/output (I/O) devices 524 for revision mark-up as described above with respect to FIG. 1, and in some embodiments of the present invention also with respect to one or more of FIGS. 2, 3 and 4.

Figure 6:
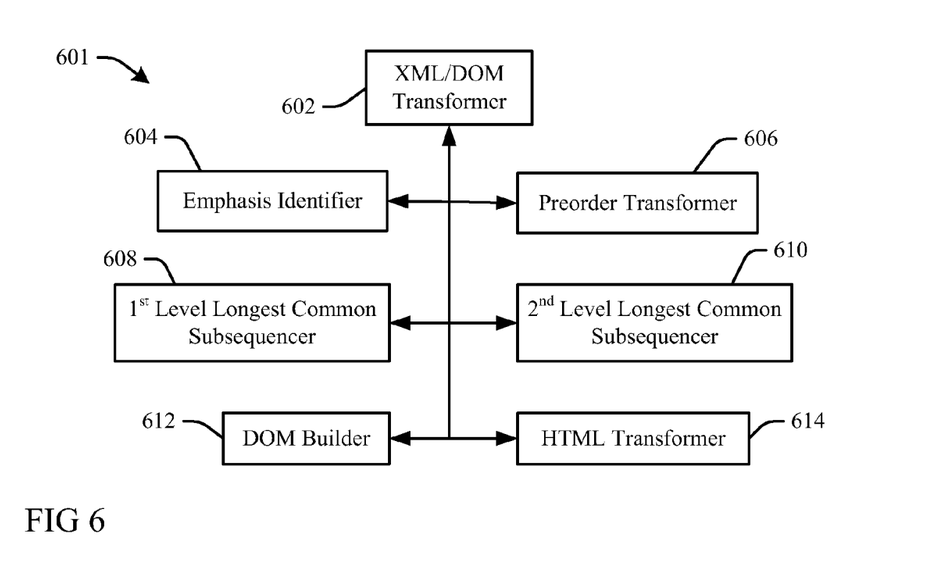
FIG. 6 is a block diagram illustration of an article according to the present invention.

FIG. 6 illustrates an embodiment of an article 601 (for example, a programmable device, system, etc.) according to the present invention that performs an automated comparison of DITA documents for revision mark-up as described above with respect to FIG. 1, and in some embodiments of the present invention also with respect to one or more of FIGS. 2, 3, 4 and 5. One or more of the components of the article 301 are tangible devices that perform specific functions, for example comprising the processing unit 538, computer readable memory 516 and tangible computer readable storage medium 532 of FIG. 5. More particularly, a DITA XML/DOM Transformer 602 reads document data from DITA XML documents into respective DOM trees. An Emphasis Identifier 604 identifies and collapses DOM sub-trees consisting of text emphasis nodes, saves them as parent node attributes and caches their XML metadata.

A Preorder Transformer 606 transforms DOM trees via preorder traversal into respective pre-order lists of nodes each comprising primary sort key information and document structure metadata, and captures adjacent sibling emphasis subtrees as a single text node. A 1$^{st}$ Level Longest Common Subsequencer 608 uses the pre-order node list primary sort key information and some of the metadata for equivalence comparison to merge overall text content and structure of read from two DITA documents into a merged node list, recognizing token-by-token fuzzy matches of node pairs and saving differences between matching tokens. A 2$^{nd}$ Level Longest Common Subsequencer 610 uses table-specific fuzzy processes to refine table comparisons in the merged node list as a function of the cached XML metadata. A DOM Builder 612 builds a document object model from the merged node list, and a HTML Transformer 614 transforms the built document object models into a HTML document for display of the saved differences between the matching tokens as text content changes via mark-ups in a merged document in a browser.

Embodiments of the present invention may also perform process steps of the invention on a subscription, advertising, and/or fee basis. That is, a service provider could offer to perform an automated comparison of DITA documents for revision mark-up as described above with respect to FIGS. 1-6. Thus, the service provider can create, maintain, and support, etc., a computer infrastructure such as the computer system 522, network environment 526, or parts thereof, or the article 601, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/601, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for automated comparison of Darwin Information Typing Architecture (DITA) documents, the method comprising executing on a processor the steps of:

reading document data from a first DITA table document into a first document object model tree comprising a plurality of nodes, and from a second DITA table document into a second document object model tree comprising a plurality of nodes;

normalizing table attributes of the first document object model tree and the second document object model tree;

transforming via preorder traversal the first document object model tree into a first pre-order node list output, and the second document object model tree into a second pre-order node list output;

constructing unique table header labels for nodes in the first pre-order node list output, and for nodes in the second pre-order node list output;

comparing, via a table-specific fuzzy Longest Common Subsequence (LCS) process, the unique table header labels of the first constructed pre-order node list output to the unique table header labels of the second constructed pre-order node list output, to thereby generate a merged header node list;

analyzing column header name text to distinguish between new and modified columns in the first constructed pre-order node list output and in the second constructed pre-order node list output; and generating a first column name map from old column names for the first constructed pre-order node list output to column names in the merged header node list, and a second column name map from old column names for the second constructed pre-order node list output to column names in the merged header node list.

2. The method of claim 1, further comprising:

integrating computer-readable program code into a computer system comprising the processor, a computer readable memory in circuit communication with the processor, and a computer readable storage medium in circuit communication with the processor; and wherein the processor executes program code instructions stored on the computer-readable storage medium via the computer readable memory and thereby performs the steps of reading the document data from the first DITA table document into the first document object model tree and from the second DITA table document into the second document object model tree, normalizing the table attributes of the first document object model tree and the second document object model tree, transforming the first document object model tree into the first pre-order node list output and the second document object model tree into the second pre-order node list output, constructing the unique table header labels for the nodes in the first pre-order node list output and for the nodes in the first pre-order node list output, comparing the unique table header labels of the first constructed pre-order node list output to the unique table header labels of the second constructed pre-order node list output to generate the merged header node list, analyzing the column header name text to distinguish between new and modified columns in the first constructed pre-order node list output and in the second constructed pre-order node list output, and generating the first column name map and the second column name map.

3. The method of claim 1, further comprising:

mapping metadata of the document data read from the first DITA table document to the merged header node list as a function of the first column name map, and metadata of the document data read from the second DITA table document to the merged header node list as a function of the second column name map;

reading the mapped metadata of the first DITA table document into first Document Object Model (DOM) tree data, and the mapped metadata of the second DITA table document into second DOM tree data;

transforming, via preorder traversal, the first DOM tree data into a first DOM pre-order node list output, and the second DOM tree data into a second DOM pre-order node list output;

constructing unique column table header labels for nodes in the first DOM pre-order node list output, and for nodes in the second DOM pre-order node list output; and comparing, via a table-specific fuzzy LCS process, the unique column header labels of the first DOM pre-order node list output to the unique column header labels of the second DOM pre-order node list output to thereby generate the merged header node list.

4. The method of claim 3, further comprising:

normalizing the merged header node list as a function of the mapped metadata to correct structural table issues.

5. The method of claim 3, wherein the step of transforming the first document object model tree into the first pre-order node list output and the second document object model tree into the second pre-order node list output captures adjacent sibling emphasis subtree nodes as single text nodes; and the method further comprising:

identifying and collapsing emphasis subtree nodes in the first document object model tree into parent nodes in the first document object model tree, and emphasis subtree nodes in the second document object model tree into parent nodes in the second document object model tree, the collapsing comprising caching emphasis data from the identified subtree nodes;

recognizing matches of node pairs of the first constructed pre-order node list output and the second constructed pre-order node list output that have primary sort key information and document structure metadata meeting a threshold percentage of match;

saving differences between matching tokens of the node pairs;

separating out table segments from the merged header node list into a table node list and a non-table node list;

recovering the cached emphasis data for the table segments in the table node list;

building a merged document object model from the merged node list and the non-table node list and the recovered cached emphasis data for the table segments in the table node list; and transforming the built merged document object model into a hypertext mark-up language document that displays the saved differences between the matching tokens as word-level highlighting mark-ups within the refined tables.

6. The method of claim 5, further comprising:

tagging and aligning matching columns as a function of comparing table headers.

7. The method of claim 5, further comprising:

re-merging table data with tagged columns so that the tagged columns stay aligned.

8. The method of claim 7, further comprising:

in response to a threshold number of words of compared phrases matching, determining that word phrases match in a node text content; and indicating word level differences as word-level highlighting mark-ups within matching compared phrases.

9. A system, comprising:

a processing unit;

a computer readable memory coupled to the processing unit; and a computer-readable storage medium coupled to the processing unit;

wherein the processing unit executes computer instructions stored on the computer-readable storage medium via the computer readable memory and is thereby caused to:

read document data from a first DITA table document into a first document object model tree comprising a plurality of nodes, and from a second DITA table document into a second document object model tree comprising a plurality of nodes;

normalize table attributes of the first document object model tree and the second document object model tree;

transform via preorder traversal the first document object model tree into a first pre-order node list output, and the second document object model tree into a second pre-order node list output;

construct unique table header labels for nodes in the first pre-order node list output, and for nodes in the second pre-order node list output;

compare, via a table-specific fuzzy Longest Common Subsequence (LCS) process, the unique table header labels of the first constructed pre-order node list output to the unique table header labels of the second constructed pre-order node list output, to thereby generate a merged header node list;

analyze column header name text to distinguish between new and modified columns in the first constructed pre-order node list output and in the second constructed pre-order node list output; and generate a first column name map from old column names for the first constructed pre-order node list output to column names in the merged header node list, and a second column name map from old column names for the second constructed pre-order node list output to column names in the merged header node list.

10. The system of claim 9, wherein the processing unit executes the program instructions stored on the computer-readable storage medium via the computer readable memory, and thereby further:

maps metadata of the document data read from the first DITA table document to the merged header node list as a function of the first column name map, and metadata of the document data read from the second DITA table document to the merged header node list as a function of the second column name map;

reads the mapped metadata of the first DITA table document into first Document Object Model (DOM) tree data, and the mapped metadata of the second DITA table document into second DOM tree data;

transforms, via preorder traversal, the first DOM tree data into a first DOM pre-order node list output, and the second DOM tree data into a second DOM pre-order node list output;

constructs unique column table header labels for nodes in the first DOM pre-order node list output, and for nodes in the second DOM pre-order node list output; and compares, via a table-specific fuzzy LCS process, the unique column header labels of the first DOM pre-order node list output to the unique column header labels of the second DOM pre-order node list output to thereby generate the merged header node list.

11. The system of claim 10, wherein the processing unit executes the program instructions stored on the computer-readable storage medium via the computer readable memory, and thereby normalizes the merged header node list as a function of the mapped metadata to correct structural table issues.

12. The system of claim 10, wherein the processing unit executes the program instructions stored on the computer-readable storage medium via the computer readable memory, and thereby:

transforms the first document object model tree into the first pre-order node list output and the second document object model tree into the second pre-order node list output by capturing adjacent sibling emphasis subtree nodes as single text nodes;

identifies and collapses emphasis subtree nodes in the first document object model tree into parent nodes in the first document object model tree, and emphasis subtree nodes in the second document object model tree into parent nodes in the second document object model tree, by caching emphasis data from the identified subtree nodes;

recognizes matches of node pairs of the first constructed pre-order node list output and the second constructed pre-order node list output that have primary sort key information and document structure metadata meeting a threshold percentage of match;

saves differences between matching tokens of the node pairs;

separates out table segments from the merged header node list into a table node list and a non-table node list;

recovers the cached emphasis data for the table segments in the table node list;

builds a merged document object model from the merged node list and the non-table node list and the recovered cached emphasis data for the table segments in the table node list; and transforms the built merged document object model into a hypertext mark-up language document that displays the saved differences between the matching tokens as word-level highlighting mark-ups within the refined tables.

13. The system of claim 12, wherein the processing unit executes the program instructions stored on the computer-readable storage medium via the computer readable memory, and thereby tags and aligns matching columns as a function of comparing table headers.

14. The system of claim 12, wherein the processing unit executes the program instructions stored on the computer-readable storage medium via the computer readable memory, and thereby:

re-merges table data with tagged columns so that the tagged columns stay aligned;

in response to a threshold number of words of compared phrases matching, determines that word phrases match in a node text content; and indicates word level differences as word-level highlighting mark-ups within matching compared phrases.

15. An article of manufacture for automated comparison of Darwin Information Typing Architecture (DITA) documents, comprising:

a computer readable hardware storage device having computer readable program code embodied therewith, wherein the computer readable hardware storage device is not a transitory signal per se, the computer readable program code comprising instructions for execution by a computer processor that cause the computer processor to:

read document data from a first DITA table document into a first document object model tree comprising a plurality of nodes, and from a second DITA table document into a second document object model tree comprising a plurality of nodes;

normalize table attributes of the first document object model tree and the second document object model tree;

transform via preorder traversal the first document object model tree into a first pre-order node list output, and the second document object model tree into a second pre-order node list output;

construct unique table header labels for nodes in the first pre-order node list output, and for nodes in the second pre-order node list output;

compare, via a table-specific fuzzy Longest Common Subsequence (LCS) process, the unique table header labels of the first constructed pre-order node list output to the unique table header labels of the second constructed pre-order node list output, to thereby generate a merged header node list;

analyze column header name text to distinguish between new and modified columns in the first constructed pre-order node list output and in the second constructed pre-order node list output; and generate a first column name map from old column names for the first constructed pre-order node list output to column names in the merged header node list, and a second column name map from old column names for the second constructed pre-order node list output to column names in the merged header node list.

16. The article of manufacture of claim 15, wherein the computer readable program code instructions for execution by the computer processor, further cause the computer processor to: map metadata of the document data read from the first DITA table document to the merged header node list as a function of the first column name map, and metadata of the document data read from the second DITA table document to the merged header node list as a function of the second column name map;

read the mapped metadata of the first DITA table document into first Document Object Model (DOM) tree data, and the mapped metadata of the second DITA table document into second DOM tree data;

transform, via preorder traversal, the first DOM tree data into a first DOM pre-order node list output, and the second DOM tree data into a second DOM pre-order node list output;

construct unique column table header labels for nodes in the first DOM pre-order node list output, and for nodes in the second DOM pre-order node list output; and compare, via a table-specific fuzzy LCS process, the unique column header labels of the first DOM pre-order node list output to the unique column header labels of the second DOM pre-order node list output to thereby generate the merged header node list.

17. The article of manufacture of claim 16, wherein the computer readable program code instructions for execution by the computer processor, further cause the computer processor to normalize the merged header node list as a function of the mapped metadata to correct structural table issues.

18. The article of manufacture of claim 16, wherein the computer readable program code instructions for execution by the computer processor, further cause the computer processor to:
  transform the first document object model tree into the first pre-order node list output and the second document object model tree into the second pre-order node list output by capturing adjacent sibling emphasis subtree nodes as single text nodes;
  identify and collapse emphasis subtree nodes in the first document object model tree into parent nodes in the first document object model tree, and emphasis subtree nodes in the second document object model tree into parent nodes in the second document object model tree, by caching emphasis data from the identified subtree nodes;
  recognize matches of node pairs of the first constructed pre-order node list output and the second constructed pre-order node list output that have primary sort key information and document structure metadata meeting a threshold percentage of match;
  save differences between matching tokens of the node pairs;
  separate out table segments from the merged header node list into a table node list and a non-table node list;
  recover the cached emphasis data for the table segments in the table node list;
  build a merged document object model from the merged node list and the non-table node list and the recovered cached emphasis data for the table segments in the table node list; and
  transform the built merged document object model into a hypertext mark-up language document that displays the saved differences between the matching tokens as word-level highlighting mark-ups within the refined tables.

19. The article of manufacture of claim 18, wherein the computer readable program code instructions for execution by the computer processor, further cause the computer processor to tag and align matching columns as a function of comparing table headers.

20. The article of manufacture of claim 18, wherein the computer readable program code instructions for execution by the computer processor, further cause the computer processor to:
  re-merge table data with tagged columns so that the tagged columns stay aligned;
  in response to a threshold number of words of compared phrases matching, determine that word phrases match in a node text content; and
  indicate word level differences as word-level highlighting mark-ups within matching compared phrases.

* * * * *